(12) United States Patent
Boisseau

(10) Patent No.: US 6,749,044 B2
(45) Date of Patent: Jun. 15, 2004

(54) DISC BRAKE CYLINDER WITH PARKING BRAKE MECHANISM

(75) Inventor: Jean-Pierre Boisseau, Paris (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/089,826
(22) PCT Filed: Nov. 26, 2001
(86) PCT No.: PCT/FR01/03717
§ 371 (c)(1), (2), (4) Date: Feb. 12, 2003
(87) PCT Pub. No.: WO02/44581
PCT Pub. Date: Jun. 6, 2002

(65) Prior Publication Data
US 2003/0164271 A1 Sep. 4, 2003

(51) Int. Cl.[7] .............................................. F16D 65/18
(52) U.S. Cl. ...................................................... 188/72.7
(58) Field of Search ........................ 188/196 D, 196 F, 188/196 BA, 71.7–72.9

(56) References Cited

U.S. PATENT DOCUMENTS 3,900,084 A * 8/1975 Farr ........................ 188/196 F
5,263,554 A * 11/1993 Mery ......................... 188/72.7
5,586,623 A * 12/1996 Mery ......................... 188/72.6
5,697,475 A * 12/1997 Le Deit et al. ............ 188/72.9

* cited by examiner

Primary Examiner—Christopher P. Schwartz
(74) Attorney, Agent, or Firm—Leo H. McCormick, Jr.; Warren Comstock

(57) ABSTRACT

A disk brake cylinder having a bore for retaining a piston (5) connected by an input shaft (11) to a parking brake mechanism. The input shaft (11) is rotated to provide linear translation of the piston through a ball ramp mechanism to effect a parking brake application. The ball-ramp mechanism includes a first groove (5) located on a face (11') of the input shaft (11) and a second groove (15') located on a face (13') of the moving member (13). The first (15) and second (15') grooves retain and trap a plurality of balls (14) and have escapement zones (16,16') with a convex surface that extend from a bottom (26) of the groove (15). The plurality of ball (14) in a rest position are located near the bottom of the convex surface but never touch the bottom (26) and as a result initial rotation of the input shaft (11) provides for non linear translation of the moving member (13) such that as the ball initially roll up the convex surface at a fast rate to take up the play in the mechanism and then moves then moves the moving member (13) at a slower rate to effect a brake application.

5 Claims, 2 Drawing Sheets

DISC BRAKE CYLINDER WITH PARKING BRAKE MECHANISM

The present invention relates to a disk brake cylinder with a parking brake mechanism and to a disk brake comprising such a cylinder.

BACKGROUND OF THE INVENTION

It is known that disk brakes, which are mounted on the rear wheels of vehicles, act as service brakes, which is their main function, and as parking brakes.

For this purpose, the cylinders of the brakes comprise an interior parking brake mechanism which is operated by pulling on a cable.

One known example of such a mechanism is the one in which the cable ends at a lever which turns a shaft. This shaft is secured to one of two circular plates which face one another and trap between them metal balls which are housed in grooves to form a ball ramp. When the plate secured to the shaft, known as the input plate, turns with respect to the second plate, which can move in terms of translation and is commonly known as the moving plate, the balls run along their grooves, first of all at the bottoms of these grooves then rising up onto the escapement zones bordering said grooves. By running first of all along the bottoms of the grooves, the balls begin by taking up the play in the parking brake mechanism. By then running along the escapement zones, the ball ramps move the two plates apart.

Through a stack of components, this relative movement of the two plates causes the brake shoes to clamp around the disk.

This parking brake mechanism is satisfactory as far as its operation is concerned, However, the inventors underlying the present invention have noticed that during the phase in which the balls are running along the bottoms of the grooves, the translational displacement of the moving plate is often not great enough to completely take up the play in the parking brake mechanism.

In consequence, this play does not become fully taken up until the balls are already running along their escapement zones.

When the play has been fully compensated for, there then remains only a small translational displacement of the moving plate left for actually applying the shoes to the disk.

This problem is all the more troublesome when the user of the vehicle tends on his own account to limit the force he applies to the parking brake actuating lever when he has moved it through a certain travel.

Thus, if, without knowing it, the user devotes most of the travel of the actuating lever to taking up the mechanical play in the parking brake mechanism, he will not provide sufficient force to completely finish applying the parking brake.

SUMMARY OF THE INVENTION

The present invention aims to provide a simple yet economical solution to the abovementioned problem.

A subject of the present invention is a disk brake cylinder comprising a piston capable of moving axially toward a disk and containing a parking brake mechanism consisting of:

an input shaft bearing against an axial stop of the cylinder preventing said shaft from moving in the opposite direction to the disk, said shaft being capable of being turned when the parking brake is operated; and a ball-ramp mechanism, comprising at least a first groove borne by the input shaft, at least a second groove facing the first groove, borne by a member capable of pushing the piston toward the disk and at least one ball trapped between these grooves, each groove comprising an escapement zone along which, when the input shaft turns with respect to said member, the ball rolls and, initially, takes up the play in the mechanism and then moves said member axially toward the piston with respect to the input shaft, characterized in that the escapement zone of the groove has an exclusively convex profile.

The disk brake cylinder according to the invention is advantageous in that the convex shape of the escapement zone of the groove allows the ball very quickly to take up the play that there is in the parking brake mechanism.

Thus, the force provided by a user on a parking brake actuating lever can be devoted almost in its entirety to applying the parking brake, without increasing the travel of the brake actuating lever. Furthermore, the convex profile of the escapement zone of the groove is recommended because the force to be provided by the user to take up the play is relatively small by comparison with the force needed to apply the brake. In consequence, when taking up the play, it is not disadvantageous for a significant axial displacement of the moving plate to be brought about for a small rotation of the input plate.

The convex profile of the escapement zone may vary. For example, it may be an arc of a circle extended by a straight line or it may be a portion of an ellipse, or alternatively it may a logarithmic shape, polynomial shape or a combination of conical sections.

Another subject of the invention is a disk brake, characterized in that it comprises a cylinder as described hereinabove.

With a view to making the invention easy to understand, one embodiment thereof, given by way of nonlimiting example, will now be described with reference to the appended drawing(.)

DETAILED DESCRIPTION OF THE INVENTION

Figure 1:
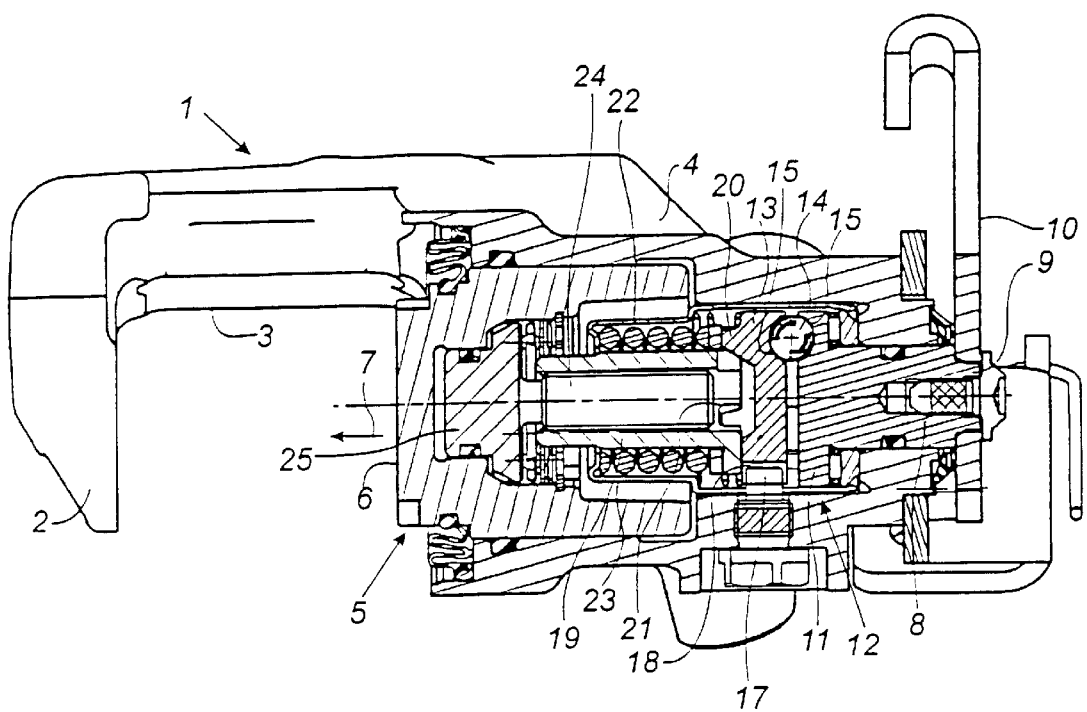
FIG. 1 is a view in section of a disk brake according to one embodiment of the invention.

The disk brake depicted in FIG. 1 consists of a caliper 1 comprising a caliper tip 2 connected by a bridge 3 to a cylinder 4.

The cylinder 4 has a bore that retains a piston 5 having an outer face 6 that exerts pressure directed in the direction of the arrow 7 on a first brake pad (not depicted).

A second brake pad (not depicted) is carried by the caliper tip 2 so as to trap the disk (not depicted) of the wheel between the two pads.

The cylinder 4 contains the actuating means that allow the pads to be applied to the disk, in a first mode of operation, when a user of the vehicle depresses the brake pedal and in a second mode of operation, when the user actuates the parking brake.

In the first mode of operation, the pedal control employs hydraulic means well known to those skilled in the art and which will not be detailed in the present description.

A parking brake mechanism, also known as the handbrake, is combined with the hydraulic means inside the cylinder.

This parking brake mechanism comprises an input shaft 8, having a first end 9 that projects from the cylinder 4 on the opposite side to the brake disk. Via this projecting end 9, the input shaft is secured in terms of rotation to a pivoting arm 10 which is connected, for example by a cable (not depicted), to the parking brake control lever located in the cabin of the vehicle.

The input shaft 8 is contained inside the cylinder 4 by an input plate 11 of a ball ramp 12, The input plate 11 consists of a moving plate 13 and of three balls 14 that are inserted in grooves 15 on opposing faces (11',13') of the input plate 11 and moving plate 13. Corresponding grooves 15,15' are in the shape of arcs of circles centered on the axis of the input plate 11 and moving plate 13.

Figure 2:
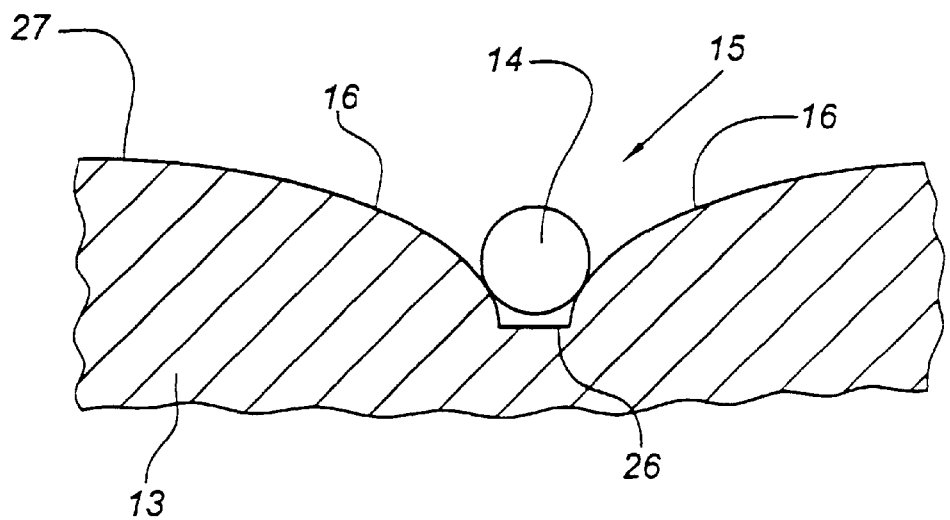
FIG. 2 is a section of a groove of a plate along a cylindrical surface coaxial with said plate.

As can be seen in FIG. 2, each groove 15 is bordered by two escapement zones 16,16' along each of which the corresponding ball 14 runs when the input plate 11 is turned while the moving plate 13 is kept stationary in terms of rotation while being free in terms of axial translation.

Thus, when the input plate 11 turns about the axis of the input shaft 8, the moving plate 13 is pushed back axially toward the piston 5.

A binding screw 17 passes through the outer wall of the cylinder 4 to open into the latter in the region of the moving plate 13, which has a slot 18 parallel to its axis of translation, into which the end of the binding screw 17 penetrates.

The moving plate 13 is thus restrained in terms of rotation by the binding screw 17, but remains free in terms of axial translation within the cylinder.

A tapped sleeve 19 also known as a nut, presses against the opposite face of the moving plate 13 to the input plate 11 and rotates as one with it by virtue of teeth 20 of the moving plate entering notches 21 in the nut 19. This nut is pushed back against the moving plate 13 by a helical spring 22 contained inside a bell housing 23 covering spring 22 and the ball ramp.

An adjusting screw 24 is screwed into the nut 19. This screw has a head 25 in the known shape of a push rod capable for exerting on the piston 5 a force aimed at moving piston 5 toward the brake disk and for securing the screw 24 in terms of rotation to the piston when it exerts this bearing force.

The way in which this parking brake mechanism works is known per se. A brief reminder of its principle is given: when the arm 10 pivots, for example under the action of a cable connected to the handbrake lever, the input shaft 8, and therefore the input plate 11, also pivot, and the moving plate 13 is pushed back toward the brake disk. The nut 19, pushed back in this way, carries with it the screw 24 whose push-rod-forming head 25, immobilized in terms of rotation in the piston 5, prevents any rotation.

In consequence, the screw 24 cannot become unscrewed in the nut 19 and the translational movement imparted on the nut 19 by the moving plate 13 is transmitted to the screw 24 then to the piston 25, give or take operating clearances.

The cross section of each groove 15 of the ball ramp of FIG. 1 will now be described.

In the example described, the groove 15 has a flat bottom 26 and two escapement zones 16,16' of logarithmic cross section, connecting the flat bottom 26 to the front face 27 of the plate 13.

Given its diameter, the ball 14 in the bottom of the groove does not rest on the flat bottom 26 but rests on the inclined base of the two escapement zones 16,16' at rest in this position of rest, the ball is near the bottom of the groove 15, and depicted in FIG. 2, but never touches the bottom 26 of the groove 15 and this particularly has the advantage that the tangent to the ball 14 at the point of contact near the bottom of the groove 15 encourages good characteristics of axial displacement as the input plate 11 turns, because this tangent is not parallel to the plane in which the input plate 11 and moving plate 13 turn.

Any risk of the ball slipping along the bottom of the groove 15 without running along its escapement zone is thus eliminated, this being a phenomenon which could occur if the tangent at the point of contact of the ball with the bottom 26 of the groove 15 were parallel to the plane in which the plate turned.

Figure 3:
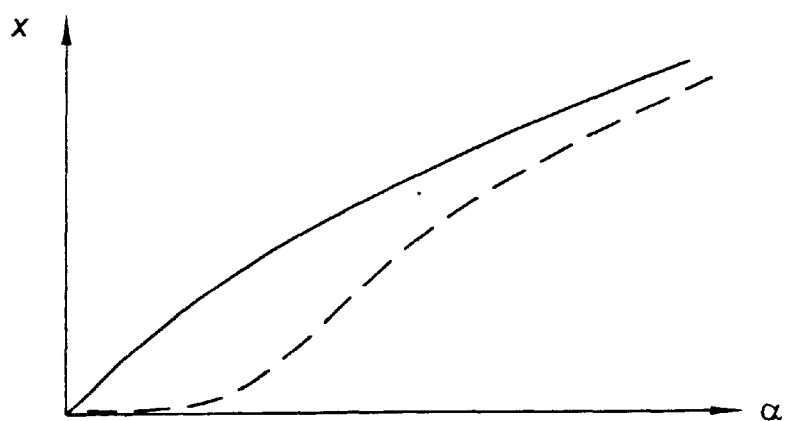
FIG. 3 is a graph representing the displacement of the moving plate as a function of the angle through which the input plate turns.

Furthermore, the logarithmic shape of the escapement zones 16,16' gives rise to an axial displacement x of the moving plate 13, with respect to the angle α through which the input plate 11 turns, a graphical representation of which is given by the graph in FIG. 3 in which it can be seen that as soon as the input plate 11 starts to turn, the moving plate 13 moves quite sharply and the axial displacement increases to an ever diminished extent as the rotation of the input plate 11 progresses.

The invention thus allows play to be taken up and allows most of the force provided by the user to be devoted to applying the brake.

By way of comparison, a broken line has been used to depict the characteristic of axial displacement of the moving plate with respect to the angle through which the input plate is turned for a ball ramp of the state of the art, in which each groove has a bottom of circular profile extended by an escapement zone or roughly straight profile.

It is clearly evident from this characteristic that most of the travel of the brake lever, which corresponds to the angle α, is taken up by the initial rolling of ball 14 from a position near the bottom 26 of groove 15.

I claim:

1. A disk brake cylinder having a bore for retaining a piston (5) that is axially moved toward a disk, said piston being connected to a parking brake mechanism for effecting a parking brake application, said parking brake mechanism consisting of:

an input member (11) that bears against an axial stop of the cylinder for preventing said shaft from moving in the opposite direction to the disk, said input member (11) being rotated to initiate a parking brake application; and a ball-ramp mechanism, comprising at least a first groove (15) located on a face (11') of said input member (11) and at least a second groove (15') located on a face (13') of a moving member (13), said first groove (15) and said second groove (15') face each other and retaining a corresponding plurality of balls (14) such that rotation of said input shaft causes axial translation in said moving member (13) and pushes the piston (5) toward the disk, said grooves (15,15') each are characterized by an escapement zones (16,16') with a flat bottom (26) that transitions into convex surfaces such that in a position of rest said ball (14) has a point of contact with the convex surfaces near the bottom of the groove (15,15') but never touches the bottom (26) of said groove and as a result initially the ball (14) rolls on the convex surfaces to provide non-linear axially movement of the moving member (13) toward the disk when the input member (11) rotates with respect to the moving plate (13) to rapidly take up the play in the parking brake mechanism.

2. The disk brake as recited in claim 1 wherein said convex surface is in an arc of a circle defined by the axis of said cylinder (4).

3. The disk brake as recited in claim 2 wherein said convex surface has a logarithmic profile that begins at said bottom (26) of said groove (15,15').

4. The disk brake as recited in claim 2 wherein said convex surface has a profile of an ellipse that begins at said bottom (26) of said groove (15,15').

5. The disk brake as recited in claim 2 wherein said convex surface has a profile of an arc of a circle that begins at said bottom (26) of said groove (15,15') and ends with a straight line that extends from a tangent.

* * * * *